United States Patent
Gemmingen

[11] Patent Number: 6,152,992
[45] Date of Patent: Nov. 28, 2000

[54] REACTOR AND PROCESS OF USING SAME

[75] Inventor: Ulrich Von Gemmingen, Munich, Germany

[73] Assignee: Linde Aktiengesellschaft, Hoellriegelskreuth, Germany

[21] Appl. No.: 09/174,589

[22] Filed: Oct. 19, 1998

[30] Foreign Application Priority Data

Oct. 22, 1997 [DE] Germany ............................ 197 46 698

[51] Int. Cl.⁷ ................................................ B01D 53/047
[52] U.S. Cl. ................................. 95/96; 96/130; 96/132; 96/144; 96/151
[58] Field of Search ................................. 95/95, 96, 97, 95/104, 114, 115; 96/121, 130–132, 138–141, 144, 151, 152

[56] References Cited

U.S. PATENT DOCUMENTS

| | | | |
|---|---|---|---|
| 2,626,675 | 1/1953 | Maher | 96/144 |
| 4,224,147 | 9/1980 | Traut | 96/131 X |
| 4,544,384 | 10/1985 | Metschl et al. | 96/130 |
| 4,698,072 | 10/1987 | Rohde et al. | 96/131 X |
| 5,232,479 | 8/1993 | Poteau et al. | 96/131 |
| 5,593,475 | 1/1997 | Minh | 96/132 X |
| 5,632,804 | 5/1997 | Schartz | 96/132 X |
| 5,716,427 | 2/1998 | Andreani et al. | 96/130 X |
| 5,759,242 | 6/1998 | Smolarek et al. | 96/144 X |
| 5,814,129 | 9/1998 | Tentarelli | 96/139 X |
| 5,882,385 | 3/1999 | Bosquain et al. | 96/138 |

FOREIGN PATENT DOCUMENTS

| | | | |
|---|---|---|---|
| 0 400 698 | 12/1990 | European Pat. Off. . | |
| 0402783 | 12/1990 | European Pat. Off. | 96/144 |
| 0 726 087 | 8/1996 | European Pat. Off. . | |
| 33 18 098 | 11/1984 | Germany . | |
| 3436408 | 4/1986 | Germany | 96/130 |
| 0284163 | 11/1990 | Germany | 96/130 |
| 3917325A1 | 11/1990 | Germany . | |
| 196 00 549 | 7/1997 | Germany . | |
| 6-277432 | 10/1994 | Japan | 96/121 |
| 0874138 | 10/1981 | U.S.S.R. | 96/152 |
| 1599061 | 10/1990 | U.S.S.R. | 96/121 |

OTHER PUBLICATIONS

European Search Report for corresponding application EP 91 11 9544, dated Dec. 10, 1998.

*Primary Examiner*—Robert H. Spitzer
*Attorney, Agent, or Firm*—Evenson, McKeown, Edwards & Lenahan, P.L.L.C.

[57] ABSTRACT

A reactor is constructed essentially cylindrically symmetrically about an essentially vertically running axis and has a shell and within the shell at least one annular bulk packing which is filled with free-flowing material and is bounded by an inner and an outer grating and, on its lower side, by a plate supported from the bottom on the shell. With simultaneous avoidance of a bypass in the top area of the reactor, in addition, as little as possible bulk packing through which flow does not pass in adsorption or reaction is to remain as dead space, so that the losses of product components during the pressure decrease can be reduced. This is achieved by providing for widening the bulk packing in the top area of the reactor. In the upper area of the reactor, the outer or outermost grating can be joined to the reactor shell in a gas-permeable manner, while the inner grating or gratings widens conically outwards. The reactor is suitable, in particular, for pressure swing adsorption processes in which the gas mixture to be purified or fractionated flows through the bulk packing from outside to inside during the adsorption phase and the pressure decrease takes place in the reverse direction of flow, that is from the inside to the outside.

36 Claims, 2 Drawing Sheets

REACTOR AND PROCESS OF USING SAME

BACKGROUND AND SUMMARY OF THE INVENTION

This application claims the priority of German application 197 46 698.2, filed in Germany on Oct. 22, 1997, the disclosure of which is expressly incorporated by reference herein.

The invention relates to a reactor which is constructed essentially cylindrically symmetrically about an essentially vertically running axis and has a shell and within the shell at least one annular bulk packing which is filled with free-flowing material and is bounded by an inner and an outer grating and, on its lower side, by a plate supported from the bottom on the shell.

The invention further relates to the use of the reactor according to the invention for pressure swing adsorption processes.

For reactors of the generic type, as are disclosed, for example, by EP-B 0 402 783—there is a further field of application. They can be used for the most varied types of reactions between a gas and an active material which is present in free-flowing form. The active material can be, for example, an adsorbent or a catalyst. The reactor can comprise a plurality of types of active material and can consist of more than one bed or one bulk packing. A bulk packing in this case is concentrically enclosed by an adjacent bulk packing.

During the reaction phase, a reaction gas is led roughly radially to the axis of symmetry of the reactor through the bed filled with active free-flowing material by passing, it, for example, to the space between shell and outer basket or outer grating and taking it off again from the space within the inner basket or inner grating. In the case of an adsorption reaction, the reactivity of the active material (adsorbent) decreases with increasing reaction time. Therefore, the adsorbent must be regenerated at regular time intervals.

This regeneration of the adsorbent can be carried principle in two different ways. Thus, firstly, during the regeneration phase, a regeneration gas, which in comparison with the gas to be purified has a different chemical composition and/or a different thermodynamic state, can be passed through the bulk packing of active material. Generally, the regeneration gas passed through the bulk packing of active material has a higher temperature than the gas mixture passed through the bulk packing during the adsorption phase; this is then termed a T(emperature) S(wing) A(dsorption) ("TSA") process. However, the laden adsorbent can also be regenerated by a pressure decrease within the bulk packing; this is then termed a P(ressure) S(wing) A(dsorption) ("PSA") process. Obviously, those skilled in the art know a multiplicity of mixed forms of TSA and PSA processes.

The reaction taking place in the reactor can consist, e.g. of a separation of gas mixtures by adsorption or of a removal of unwanted constituents by adsorption from a gas to be purified. A practical example of the latter is the separation of water and/or carbon dioxide from air which is fed to a low-temperature air fractionation plant. The free-flowing material which is introduced into the packed bed acts as adsorbent in this case and can, for example, consist of a molecular sieve, zeolite and/or alumina gel.

During the reaction phase or adsorption phase, the air to be purified is led through the bed or the bulk packing and water and/or carbon dioxide is given off in this operation to the active material, that is to say is adsorbed to this. During the regeneration phase, the substances removed from the air are desorbed again, by passing a regeneration gas, for example nitrogen, through the bed containing the adsorbent. In this operation, generally, as described above, temperatures and/or pressures other than those during the adsorption phase prevail.

A reactor of the type mentioned at the outset can, in addition, be used for catalytic reactions, for example for the removal of $No_x$ from the exhaust gas of combustion plants. The free-flowing material in this case consists, for example, of metal-doped molecular sieve particles.

A central problem in the construction of a reactor of this type is that what are termed bypass flows must be avoided in the top area of the reactor. For this purpose, in the top area of the reactor, a dead space containing bulk packing material through which flow does not pass, or only slightly, is provided, which dead space compensates for the compression of bulk packing by 2 to 5% which is unavoidable after the filling and start-up, and the associated fall of the bulk packing.

Reactors of the type mentioned at the outset are also used at high throughput with pressure-swing regenerated adsorption plants, such as in what are termed "heatless dryers" or vacuum-regenerated PSA processes for $O_2$, production from air or for CO, separation from blast furnace gases. In these PSA processes, the pressure drops in the regeneration phase must be kept as low as possible. In particular during an adsorption operation from outside to inside—this means that the feed gas flows, through the bulk packing radially from outside to inside—and regeneration by pressure decrease and accompanying flushing from inside to outside, in each case at the point of greatest gas input, the area of passage is also greatest and thus the overall pressure drop is lowest. This fact effectively reinforces the desorption and thus improves the working loading.

Since, in the case of pressure-swing regenerated adsorbers, only low temperature differences arise due to heats of adsorption and desorption, the gratings for holding the bulk packing can be constructed, for example, as perforated sheets without special measures for compensating for reaction to temperature changes; this considerably reduces the reactor manufacturing costs.

However, the central problem when radial flow reactors are used is, in the case of PSA processes, that the losses from the upper dead space zone due to the then frequent pressure changes—the switch-over between adsorption and desorption phases is carried out at intervals between 0.5 and 10 minutes—become marked and, as a result, when the known reactor structures, which are used, in particular, in the case of TSA processes, are simply applied to PSA processes, attractive design is no longer possible.

An object therefore underlying the invention is to develop further the reactor of the type mentioned at the outset to the extent that, with simultaneous avoidance of a bypass in the top area of the reactor, as little as possible bulk packing through which flow does not pass in adsorption or reaction remains as dead space, so that the losses of product components can be reduced during the pressure decrease.

This object is achieved according to preferred embodiments of the present invention by virtue of the fact that means are provided for widening the bulk packing in the top area of the reactor.

These means for widening the bulk packing in the top area of the reactor can be constructed in accordance with an embodiment of the reactor according to the invention, e.g. in the following way: in the upper area of the reactor, the outer grating is joined to the reactor shell in a gas-permeable manner and the inner grating or gratings widen conically outwards.

These structural measures achieve a widening of the bulk packing in the top area of the reactor which, firstly, decreases the fall in bulk packing due to compression and decreases the associated bypass risk, due to the base area expanded above. Secondly, a considerable simplification in construction in comparison with known reactor structures having dome-shaped outer and inner gratings is achieved. In addition, in this manner, a uniform flow in the top area through the conically widened inner grating or gratings is achieved, as a result of which the resistance to flow is decreased precisely in the top area of the reactor through which flow previously passed poorly, due to the substantial increase in the inner area of passage.

According to advantageous embodiments of the reactor according to the invention, the inner grating or gratings widen outwards at an angle of from 1° to 45° to the essentially vertically running axis. The outer or outermost grating is—developing further advantageously the reactor according to the invention—joined to the reactor shell at an angle of from 0° to 45° to the horizontal.

In a further development of the reactor according to the invention, it is proposed that the inner grating or gratings preferably widen outwards at the height at which the outer grating is joined to the reactor shell in a gas-permeable manner.

The distance between the joint between the outer grating and the reactor shell and the upper reactor rim is preferably between 80 and 130% of the radial packing thickness of the bulk packing.

Other objects, advantages and novel features of the present invention will become apparent from the following detailed description of the invention when considered in conjunction with the accompanying drawings.

DETAILED DESCRIPTION OF THE DRAWINGS

Figure 1:
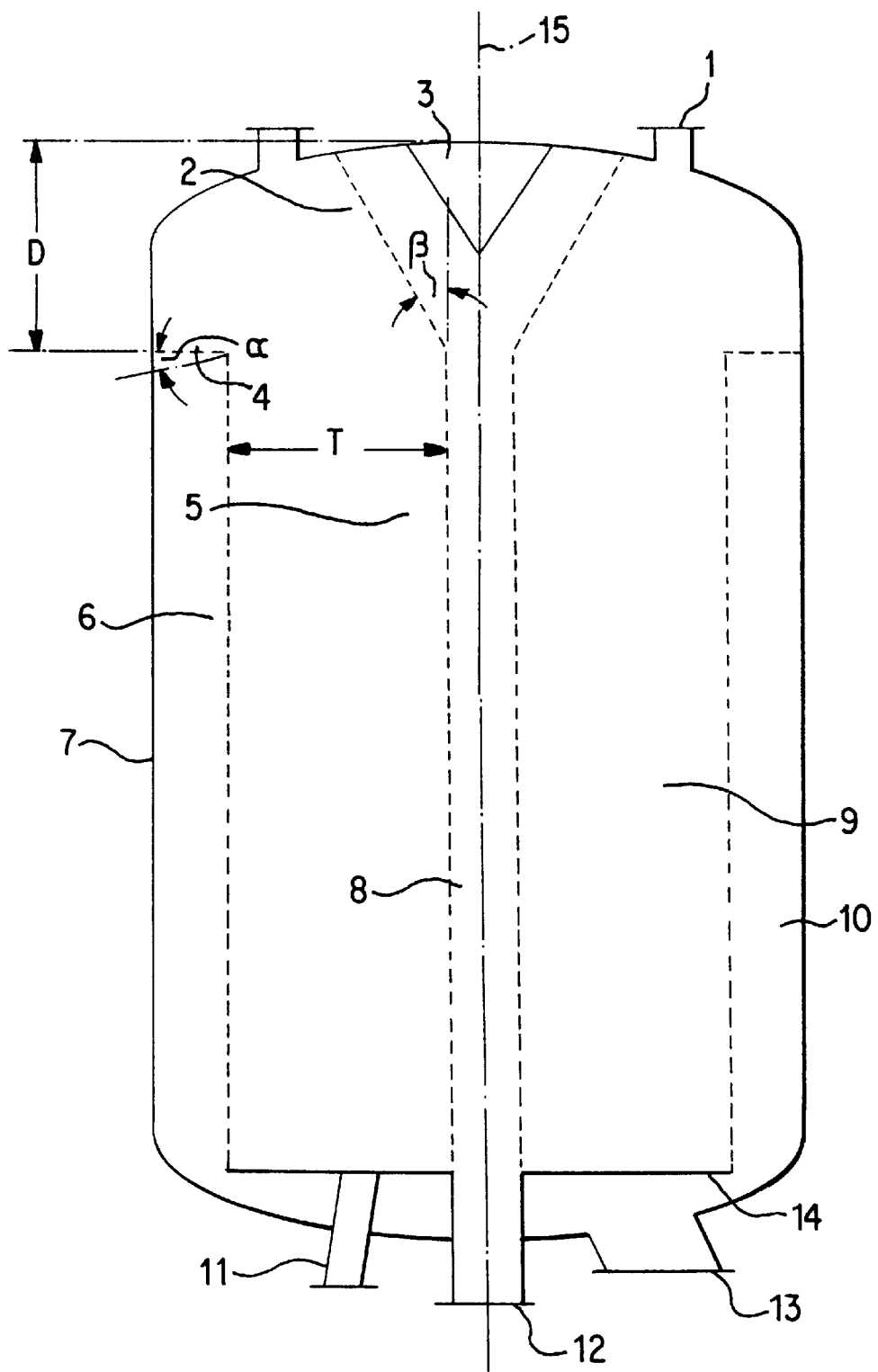
FIG. 1 is a schematic part sectional view of a reactor constructed according to a preferred embodiment of the invention.
Figure 2:
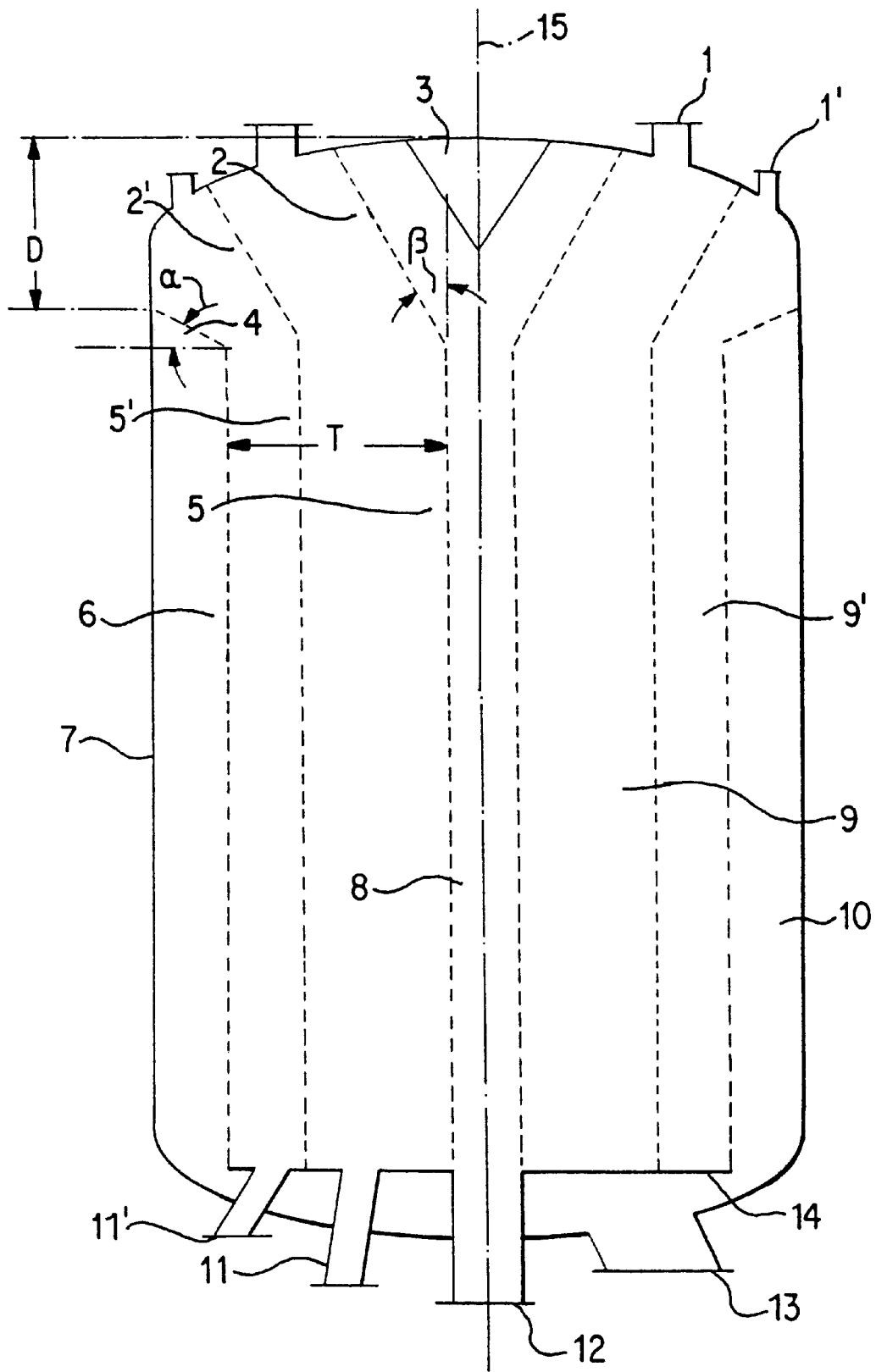
FIG. 2 is a schematic part sectional view of a reactor constructed according to another preferred embodiment of the invention.

FIGS. 1 and 2 show the basic structure of exemplary embodiments of the reactor according to the invention together with their essential features. For the sake of simplicity, the drawings are executed very diagrammatically, in particular, the ratios between the outer dimensions of the reactor and the material thicknesses do not correspond to the actual dimensions.

The reactor—as shown in FIGS. 1 and 2—is essentially constructed cylindrically symmetrically about the axis 15. It is bounded on the outside by a shell 7 which has an upper and a lower dome cap. The upper dome cap has one or more ports 1 for charging the bulk packing material. If the reactor has two or more bulk packings 9, 9', then, as shown in FIG. 2, separate ports 1, 1' are to be provided for charging the bulk packing materials. In the lower dome cap, inlet ports 13 and outlet ports 12 are provided for the gas or gas mixture to be fed to the reactor and removed from the reactor, respectively. In addition, outlet orifices 11, 11' are to be provided for the free-flowing bulk packing materials. The number of ports 1, 1', which are required for uniform and complete charging of the bulk packing spaces with the bulk packing material or materials may be determined by calculation using specialist knowledge.

FIG. 1 shows the reactor according to the invention in the interior of which is arranged an annular bulk packing 9; this bulk packing is bounded by two cylindrical baskets or gratings—an outer grating 6 and an inner grating 5. The bulk packing 9 is closed off at the bottom by the plate 14 which is generally rigidly fixed to the lower dome cap of the shell 7 via ribs arranged in a star shape which, for the sake of clarity, are not shown in the diagram. The bulk packing 9 consists of free-flowing material. In the specific use of the reactor it is adsorbent material, but it can equally well be packed with a free-flowing catalyst.

According to the invention, the outer grating 6 in the upper area of the reactor is joined in a gas-permeable manner via a connection grating 4 to the reactor shell 7 and the inner grating 5 widens conically outwards (2) in this area.

The gas to be purified, for example air, flows through the inlet orifice 13 into the lower area of the reactor, is deflected by the lower side of the plate 14 and during this any precipitable water is separated off. The gas is then passed into the outer annular space 10 between shell 7 and outer grating 6. From there, the gas flows with a radial component through the bulk packing 9 or the adsorption bed into the inner annular space 8. In the area of the annular space 8 in which the inner grating 2 widens, preferably, a displacement cone 3 is arranged. This displacement cone 3 firstly decreases the gas-side dead space and secondly makes improved flow possible through the top area of the bulk packing.

From the annular space 8, the purified gas is taken off again from the reactor via the outlet orifice 12.

If a regeneration is necessary in the reaction, during the regeneration phase, a regeneration gas, for example nitrogen, is conducted through the bulk packing 9 in the reverse direction.

FIG. 2 shows—in contrast to the reactor structure as shown in FIG. 1—the reactor according to the invention in the interior of which are arranged two annular bulk packings 9, 9'; whereas the outer bulk packing 9' is bounded by the two cylindrical baskets or gratings 6 and 5', the inner bulk packing 9 is bounded by the two cylindrical gratings 5' and 5. As mentioned above, separate ports for charging 1, 1' and discharging 11, 11' the bulk packing materials must be provided for each bulk packing 9, 9'.

In the case of two or more bulk packings 9, 9', also in turn the outermost grating 6 is joined in the upper area of the reactor in a gas-permeable manner via, for example, a connection grating 4 to the reactor shell 7. The inner gratings 5, 5' widen conically outwards in the upper area of the reactor. Whereas the outer or outermost grating 6 is joined to the reactor shell 7 at an angle $\alpha$ from 0 to 45° to the horizontal, the inner gratings 5, 5' widen outwards 2, 2' at an angle $\beta$ of from 1 to 45° to the essentially vertically running axis 15 of the reactor.

In especially preferred embodiments of the invention, the distance D between the joint between the outer grating (4) and the reactor shell (7) and the upper reactor rim is between 80 and 130% of the radial packing thickness T of the bulk packing (9).

The reactor according to the invention is suitable, in particular, for pressure swing adsorption processes in which the gas mixture to be purified or fractionated flows through the bulk packing 9 from outside to inside during the adsorption phase and the pressure decrease takes place in the reverse direction flow, that is from the inside to the outside.

Below, examples of structural data and parameters for the reactor according to the invention may be specified for the use of two reactors arranged in parallel in a vacuum pressure swing adsorption plant for oxygen production:

Air inflow:
  10,000 m$^3$ (S.T.P.)/h, 1 bar, 20° C., adsorption period 35 seconds
Regeneration:
  vacuum pump having an effective suction capacity of 20,000 m$^3$/h, final pressure 0.15 bar
Containers:
  Outer diameter 3.2 m.
  Outer grating molecular sieve:
    diameter 3.0 m.
  Inner grating molecular sieve:
    diameter 0.6 m.
  Overall height 4.8 m.
  Top area at a height of from 3.8 to 4.8 m.
  Inner grating diameter at the top of the vessel wall 1.0 m.
  Cone angle β 11.3°.
  Molecular sieve mass 18,500 kg, of which flow passes through 17,800 kg corresponding to 97%.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process of using a reactor which is constructed essentially cylindrically symmetrically about an essentially vertically running axis and has a shell and within the shell at least one annular bulk packing which is filled with free-flowing material and is bounded by an inner and an outer grating and, on its lower side, by a plate supported from the bottom on the shell, wherein the bulk packing bordered by the inner and outer grating is widened to form a widened bulk packing in a top area of the reactor, wherein the outer grating in the top area of the reactor which borders the widened bulk packing is gas-permeable, said process comprising use of the reactor for pressure-swing adsorption processes,
  wherein the gas mixture to be purified or fractionated flows through the bulk packing from the outside to the inside during the adsorption phase, and the pressure reduction takes place in the opposite direction from the inside to the outside.

2. Process according to claim 1, wherein in the top area of the reactor, the outer grating is joined to the reactor shell, and said widened bulk packing is formed by the inner grating widening conically outwards.

3. Reactor which is constructed essentially cylindrically symmetrically about an essentially vertically running axis and has a shell and within the shell at least one annular bulk packing which is filled with free-flowing material and is bounded by an inner and an outer grating and, on its lower side, by a plate supported from the bottom on the shell, wherein the bulk packing bordered by the inner and outer grating is widened to form a widened bulk packing in a top area of the reactor,
  wherein the outer grating in the top area of the reactor which borders the widened bulk packing is gas permeable.

4. Reactor according to claim 3, wherein, in the upper area of the reactor, the outer grating is joined to the reactor shell, and said widened bulk packing is formed by the inner grating widening conically outwards.

5. Reactor according to claim 4, wherein the outer grating is joined to the reactor shell at an angle of from 0° to 45° to the horizontal.

6. Reactor according to claim 4, wherein the inner grating widens outwards at an angle of from 1° to 45° to the essentially vertically running axis.

7. Reactor according to claim 4, wherein the inner grating widens outwards commencing at a height at which the outer grating is joined to the reactor shell.

8. Reactor according to claim 4, wherein the distance between the joint between the outer grating and the reactor shell and the upper reactor rim is between 80% and 130% of the radial packing thickness of the bulk packing.

9. Reactor according to claim 4, wherein a displacement body is disposed in the area in which the inner grating widens conically outward to thereby decrease the volume of an annular space defined by the inner grating and serving for gas feed and/or gas removal within the at least one annular bulk packing.

10. Reactor according to claim 3, wherein the outer grating is joined to the reactor shell at an angle of from 0° to 45° to the horizontal.

11. Reactor according to claim 10, wherein the inner grating widens outwards at an angle of from 1° to 45° to the essentially vertically running axis.

12. Reactor according to claim 10, wherein the inner grating widens outwards commencing at a height at which the outer grating is joined to the reactor shell.

13. Reactor according to claim 10, wherein the distance between the joint between the outer grating and the reactor shell and the upper reactor rim is between 80% and 130% of the radial packing thickness of the bulk packing.

14. Reactor according to claim 3, wherein the inner grating widens outwards at an angle of from 1° to 45° to the essentially vertically running axis.

15. Reactor according to claim 14, wherein the inner grating widens outwards commencing at a height at which the outer grating is joined to the reactor shell.

16. Reactor according to claim 14, wherein the distance between the joint between the outer grating and the reactor shell and the upper reactor rim is between 80% and 130% of the radial packing thickness of the bulk packing.

17. Reactor according to claim 3, wherein the inner grating widens outwards commencing at a height at which the outer grating is joined to the reactor shell.

18. Reactor according to claim 17, wherein the distance between the joint between the outer grating and the reactor shell and the upper reactor rim is between 80% and 130% of the radial packing thickness of the bulk packing.

19. Reactor according to claim 17, wherein a displacement body is disposed in the area in which the inner grating widens conically outward to thereby decrease the volume of an annular space defined by the inner grating and serving for gas feed and/or gas removal within the at least one annular bulk packing.

20. Reactor according to claim 3, wherein the distance between the joint between the outer grating and the reactor shell and the upper reactor rim is between 80% and 130% of the radial packing thickness of the bulk packing.

21. Reactor according to claim 3, wherein said at least one annular bulk packing includes two concentric annular bulk packings bounded radially by respective inner and outer gratings, said annular bulk packings being supported at their bottoms by a plate supported by the reactor shell.

22. Reactor according to claim 21, wherein an outermost of said gratings is joined to the reactor shell in a gas permeable manner at an upper area of the reactor, and wherein the inner gratings widen conically radially outwards in an upward direction in said upper area.

23. Reactor according to claim 22, wherein a top portion of the outermost of said gratings extends to a connection at the shell at an outer angle of between 0° and 45° with respect to the horizontal.

24. Reactor according to claim 23, wherein said outer grating angle is between 5° and 30° with respect to the horizontal.

25. Reactor according to claim 23, wherein both of said inner gratings extend conically outward in an upper area of the reactor at an inner grating angle of between 1° and 45° with respect to the vertically running axis.

26. Reactor according to claim 25, wherein said outer grating angle is between 5° and 30° with respect to the horizontal.

27. Reactor according to claim 26, wherein said inner grating angle is between 5° and 30°.

28. Reactor according to claim 21, wherein both of said inner gratings extend conically outward in an upper area of the reactor at an inner grating angle of between 1° and 45° with respect to the vertically running axis.

29. Reactor according to claim 28, wherein said inner grating angle is between 5° and 30°.

30. Reactor according to claim 21, wherein the distance D between the joint between the outer grating and the reactor shell and the upper reactor rim is between 80% and 130% of the radial packing thickness of the bulk packing.

31. Reactor which is constructed essentially cylindrically symmetrically about an essentially vertically running axis and has a shell and within the shell at least one annular bulk packing which is filled with free-flowing material and is bounded by an inner and an outer grating and, on its lower side, by a plate supported from the bottom on the shell, wherein the bulk packing is widened in the top area of the reactor, wherein the distance between the joint between the outer grating and the reactor shell and the upper reactor rim is between 80% and 130% of the radial packing thickness of the bulk packing.

32. Reactor according to claim 31, wherein in the upper area of the reactor, the outer grating is joined to the reactor shell in a gas-permeable manner and the inner grating widens conically outwards.

33. Reactor according to claim 31, wherein the outer grating is joined to the reactor shell at an angle of from 0° to 45° to the horizontal.

34. Reactor according to claim 31, wherein the inner grating widens outwards at an angle of from 1° to 45° to the essentially vertically running axis.

35. Reactor according to claim 31, wherein the inner grating widens outwards commencing at a height at which the outer grating is joined to the reactor shell in a gas-permeable manner.

36. Reactor according to claim 31, wherein said at least one annular bulk packing includes two concentric annual bulk packings bounded radially by respective inner and outer gratings, said annular bulk packings being supported at their bottoms by a plate supported by the reactor shell.

* * * * *